United States Patent [19]
Kuroha et al.

[11] Patent Number: 6,028,650
[45] Date of Patent: Feb. 22, 2000

[54] LIQUID CRYSTAL DISPLAY APPARATUS WITH UNIFORM FEED-THROUGH VOLTAGE IN PANEL

[75] Inventors: Syoichi Kuroha; Takahiko Watanabe; Wakahiko Kaneko; Osamu Sukegawa, all of Tokyo, Japan

[73] Assignee: NEC Corporation, Tokyo, Japan

[21] Appl. No.: 08/896,609

[22] Filed: Jul. 18, 1997

[30] Foreign Application Priority Data

Jul. 19, 1996 [JP] Japan ..................... 8-190994

[51] Int. Cl.[7] .......................... G02F 1/136; G02F 1/1343
[52] U.S. Cl. ...................... 349/38; 349/39; 349/110
[58] Field of Search ................... 349/38, 39, 42, 349/43, 110, 143; 345/92

[56] References Cited

U.S. PATENT DOCUMENTS

| | | | |
|---|---|---|---|
| 4,810,060 | 3/1989 | Ukai | 349/39 |
| 5,668,613 | 9/1997 | Kim et al. | 349/39 |
| 5,781,262 | 7/1998 | Suzuki et al. | 349/38 |

FOREIGN PATENT DOCUMENTS

| | | |
|---|---|---|
| 2-184823 | 7/1990 | Japan . |
| 2306221 | 12/1990 | Japan . |
| 4-166815 | 6/1992 | Japan . |
| 5-232509 | 9/1993 | Japan . |

*Primary Examiner*—William L. Sikes
*Assistant Examiner*—Tai V. Duong
*Attorney, Agent, or Firm*—Sughrue, Mion, Zinn, Macpeak & Seas, PLLC

[57] ABSTRACT

In a liquid crystal display apparatus including a plurality of gate lines, a plurality of drain lines, and a plurality of pixels each including a liquid crystal cell having a pixel electrode connected to a storage capacitor and a switching element connected between the liquid crystal cell and one of the drain lines, a gate of the switching element is connected to one of the gate lines, and a capacitance of the storage capacitor is changed in accordance with a distance between said pixel and an input end of a corresponding one of the gate lines.

6 Claims, 13 Drawing Sheets

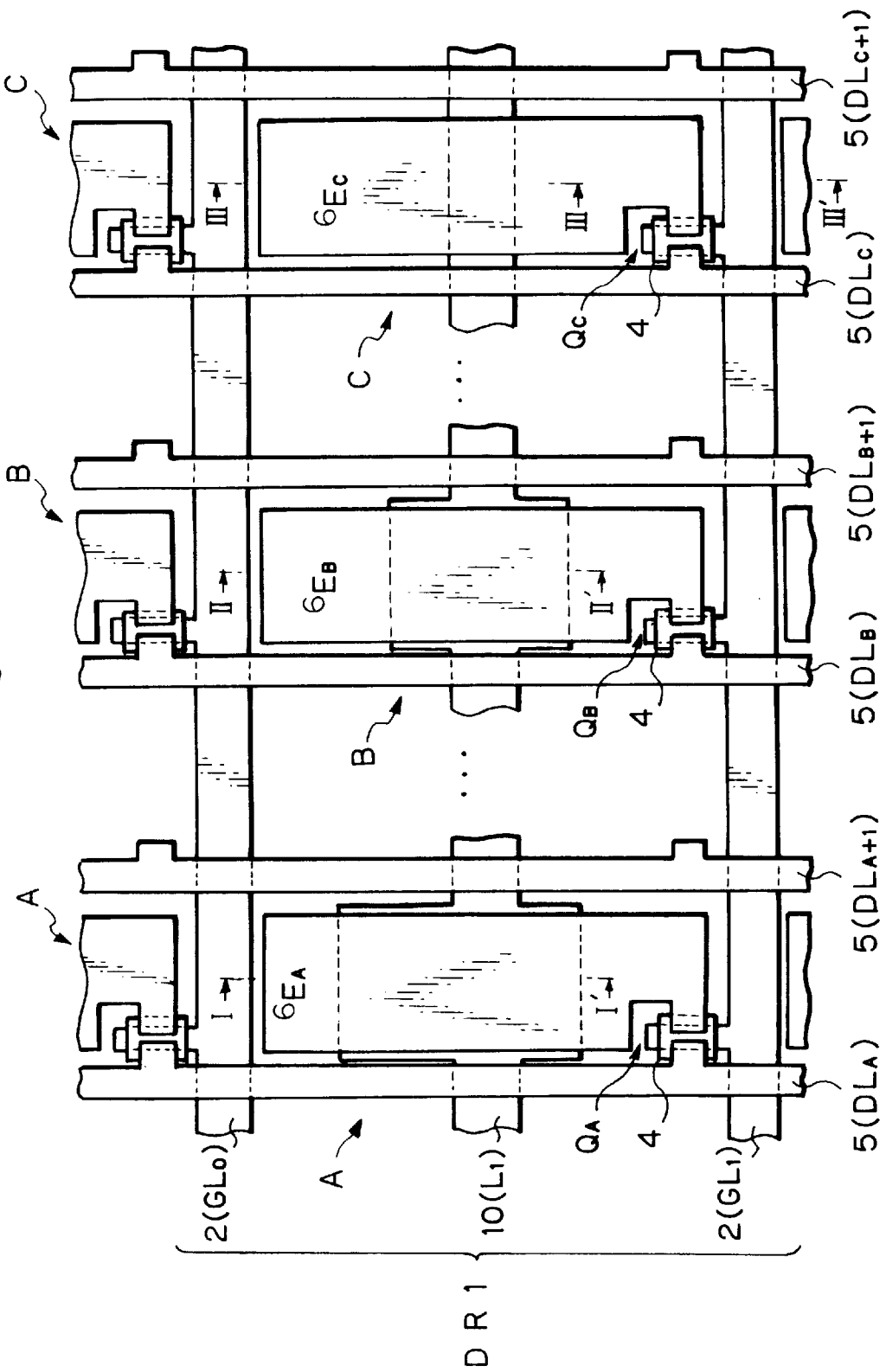

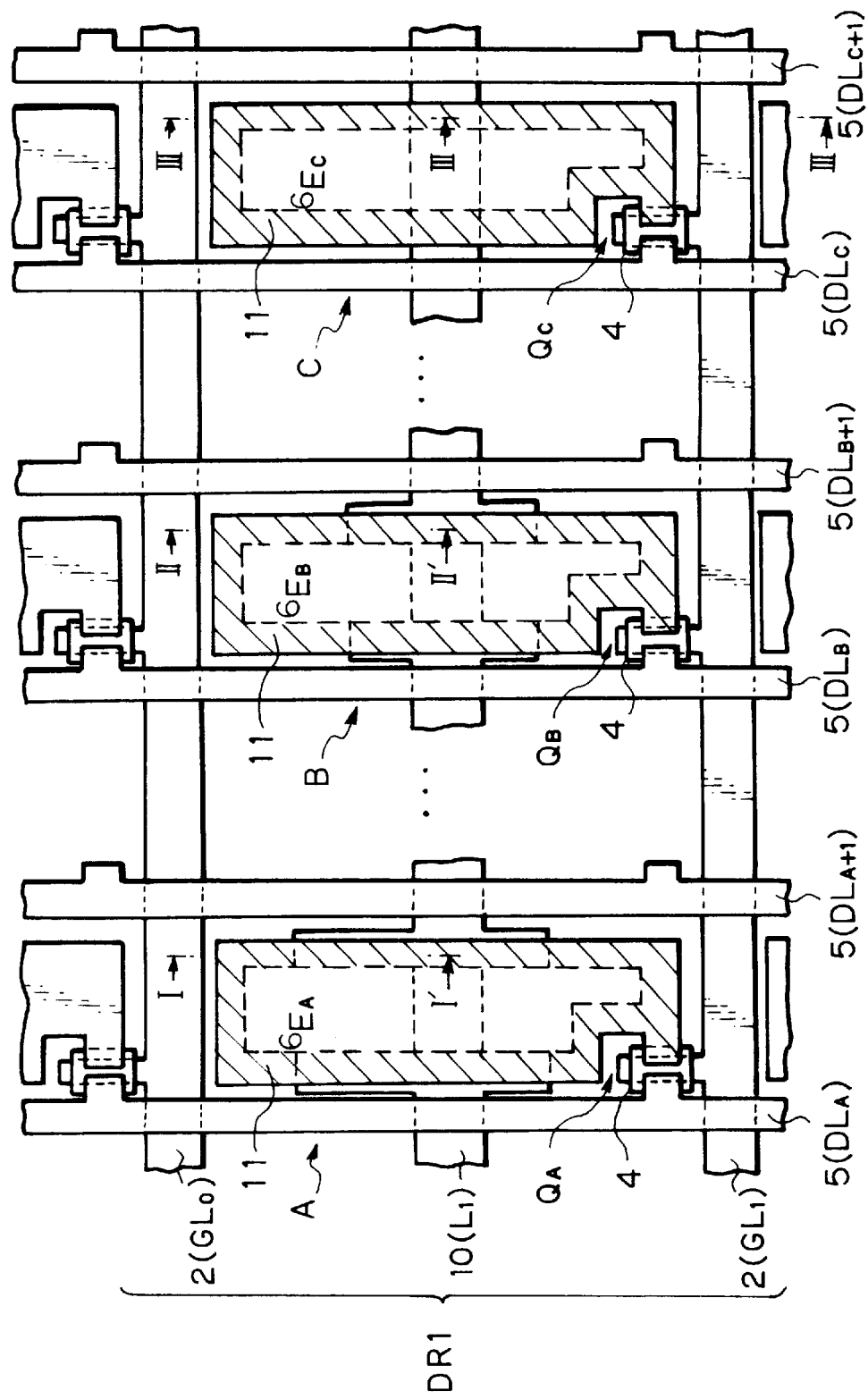

LIQUID CRYSTAL DISPLAY APPARATUS WITH UNIFORM FEED-THROUGH VOLTAGE IN PANEL

BACKGROUND OF THE INVENTION

1. Field of the Invention

The present invention relates to an active matrix liquid crystal display (LCD) apparatus.

2. Description of the Related Art

Active matrix LCD apparatuses formed by liquid crystal cells and thin film transistors (TFTs) have adopted polarity reversion driving systems to improve the picture quality such as the contrast and response speed for moving pictures. As a result, such LCD apparatuses have been broadly used in portable personal computers, desktop personal computers and the like.

For example, a pixel of a gate storage type LCD apparatus is formed by a liquid crystal cell connected to a common counter electrode, a TFT connected between a drain line and the liquid crystal cell, and a storage capacitor between the liquid crystal cell and a gate line adjacent to a gate line of this pixel. In this case, usually, since the capacitance of the storage capacitor is definite, a feed-through voltage fluctuates in the apparatus. Particularly, as LCD aparatuses have been increased in size and numerical aperture, and fine-structured, so that the width of the gate lines is reduced to increase the resistance thereof, the feed-through voltage greatly fluctuates. This will be explained later in detail.

In order to reduce the fluctuation of the feed-through voltage array, the resistances of the gate lines can be reduced. For example, the thickness of the gate lines can be reduced, and also, the gate lines can be made of material such as aluminum or gold having a low resistance. However, if the thickness of the gate lines is increased or the gate lines are made of the above-mentioned material, the manufacturing steps have to be changed.

Also, in a prior art LCD apparatus, the sizes of TFTs are gradually increased, thus compensating for the in-plane-fluctuation of the feed-through voltage (see JP-A-3-306221). This will also be explained later in detail. In this prior art LCD apparatus, however, the leakage current of the TFTs is increased.

SUMMARY OF THE INVENTION

It is an object of the present invention to provide an LCD apparatus capable of suppressing the fluctuation of feed-through voltage without modification of the manufacturing steps and without increasing the leakage current of the TFTs.

According to the present invention, in a liquid crystal display apparatus including a plurality of gate lines, a plurality of drain lines, and a plurality of pixels each including a liquid crystal cell having a pixel electrode connected to a storage capacitor and a switching element connected between the liquid crystal cell and one of the drain lines, a gate of the switching element is connected to one of the gate lines, and a capacitance of the storage capacitor is changed in accordance with a distance between the pixel and an input end of a corresponding one of the gate lines.

BRIEF DESCRIPTION OF THE DRAWINGS

The present invention will be more clearly understood from the description as set forth below, compared with prior art, with reference to the accompanying drawings, wherein:

FIG. 10 is a plan view illustrating a second embodiment of the LCD apparatus according to the present invention;

FIG. 13 is a plan view illustrating a modification of the apparatus of FIG. 10.

DESCRIPTION OF THE PREFERRED EMBODIMENTS

Before the description of the preferred embodiments, a prior art LCD apparatus will be explained with reference to FIGS. 1, 2 and 3.

Figure 1:
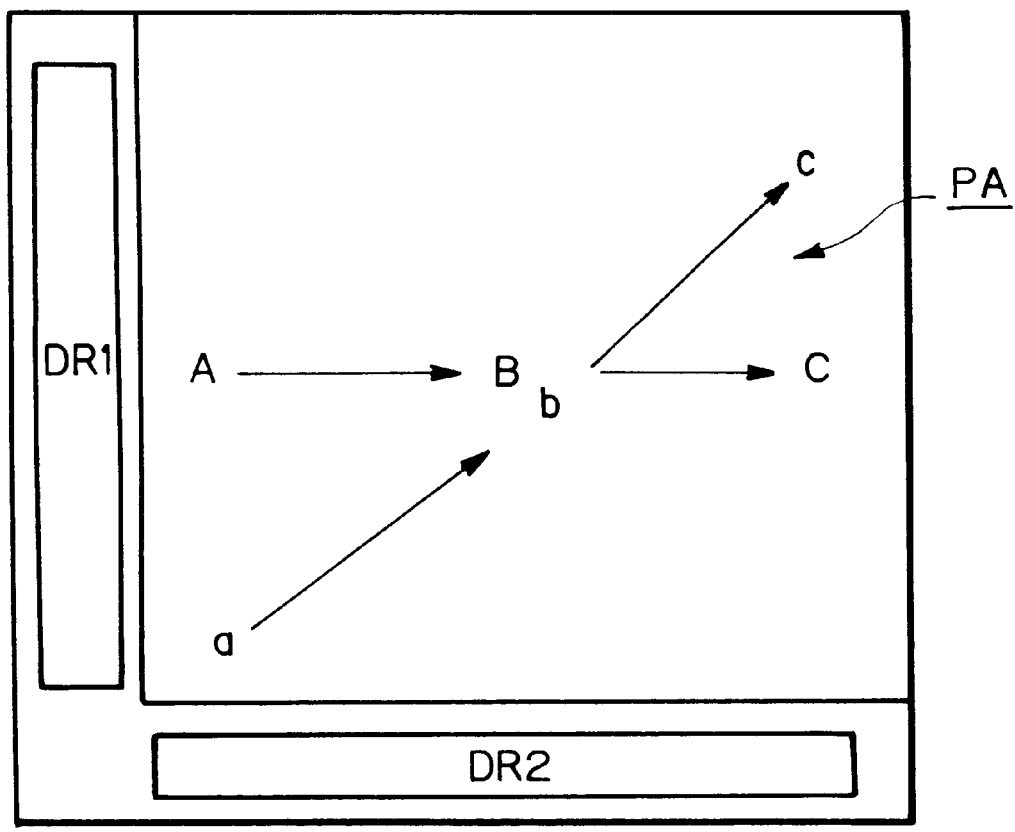
FIG. 1 is a diagram illustrating a general LCD apparatus.

In FIG. 1, which illustrates a general LCD apparatus, reference PA designates a pixel array, DR1 designates a gate line driving circuit, and DR2 designates a drain line driving circuit.

Figure 2:
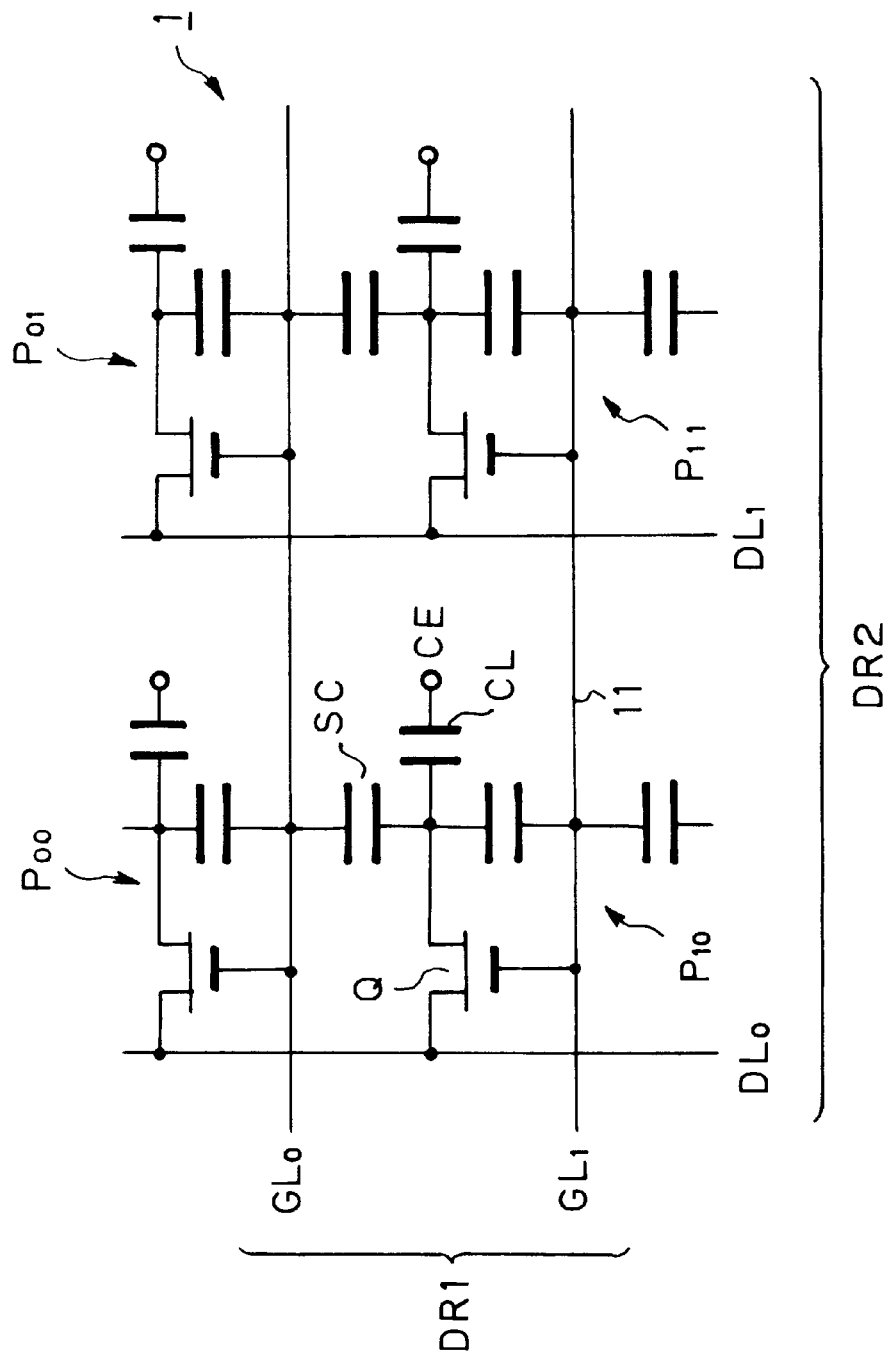
FIG. 2 is a circuit diagram of the apparatus of FIG. 1.

As illustrated in FIG. 2, which is a gate storage type LCD apparatus, the pixel array PA includes a plurality of pixels $P_{00}$, $P_{01}$, ... connected gate lines $GL_0$, $GL_1$, ... driven by the gate line driving circuit DR1 and drain lines $DL_0$, $DL_1$, ... driven by the drain line driving circuit DR2. In more detail, each of the pixels, such as $P_{10}$, is formed by a liquid crystal cell CL connected to a common counter electrode CE, a TFT Q connected between the drain line $DL_0$ and the liquid crystal cell CL, and a storage capacitor SC between the liquid crystal cell LC and the gate line $GL_0$ adjacent to the gate line $GL_1$.

At each of the pixels, a feed-through voltage $V_{FD}$ is represented by $$V_{FD} = [C_{GS}/(C_{LC} + C_{SC} + C_{GS})] \cdot \Delta V_G \quad (1)$$

where $C_{GS}$ is a capacitance between the gate and source of the TFT Q;

$C_{LC}$ is a capacitance of the liquid crystal cell LC;

$C_{SC}$ is a capacitance of the storage capacitor SC; and $\Delta V_G$ is an amplitude of a pulse voltage applied to the gate line such as $GL_1$.

On the other hand, when a falling edge of the pulse voltage at the gate line such as $GL_1$ is rounded by the resistance of the gate line, a current $I_{DS}$ flows from the drain line $DL_0$ to the source electrode of the TFT Q while the TFT Q is turned ON. Therefore, the feed-through voltage $V_{FD}$ is actually represented by $$V_{FD}=(C_{GS} \cdot \Delta V_G - \int I_{DS} dt)/(C_{LC}+C_{SC}+C_{GS}) \quad (2)$$

The value $\int I_{DS} dt$ is dependent upon the rounded amount of the falling edge of the pulse voltage. Therefore, at the pixels such as "A" and "a" as illustrated in FIG. 1 near to the gate line driving circuit DR1, the value of $\int I_{DS} dt \approx 0$. Also, at the pixels such as "C" and "c" as illustrated in FIG. 1 far from the gate line driving circuit DR1, the value of $\int I_{DS} dt$ is very large. Further, at the pixels such as "B" and "b" as illustrated in FIG. 1, the value of $\int I_{DS} dt$ is medium. Therefore, there is generated the following in-plane fluctuation in the pixel array PA1:

$$\Delta V_{FD}=(\int I_{DS} dt) max/(C_{LC}+C_{SC}+C_{GS}) \quad (3)$$

In order to reduce the fluctuation $\Delta V_{FD}$ in the pixel array PA, in a first prior art LCD apparatus, the resistances of the gate lines $GL_0$, $GL_1$, ... can be reduced. For example, the width and/or thickness of the gate lines $GL_0$, $GL_1$, ... can be reduced, and also, the gate lines $GL_0$, $GL_1$, ... can be made of material such as aluminum or gold having a low resistance. However, if the thickness of the gate lines $GL_0$, $GL_1$, ... is increased or the gate lines $GL_0$, $GL_1$, ... are made of the above-mentioned material, the manufacturing steps have to be changed. Also, if the width of the gate lines. $GL_0$, $GL_1$, ... is increased, the numerical aperture is reduced.

Figure 3:
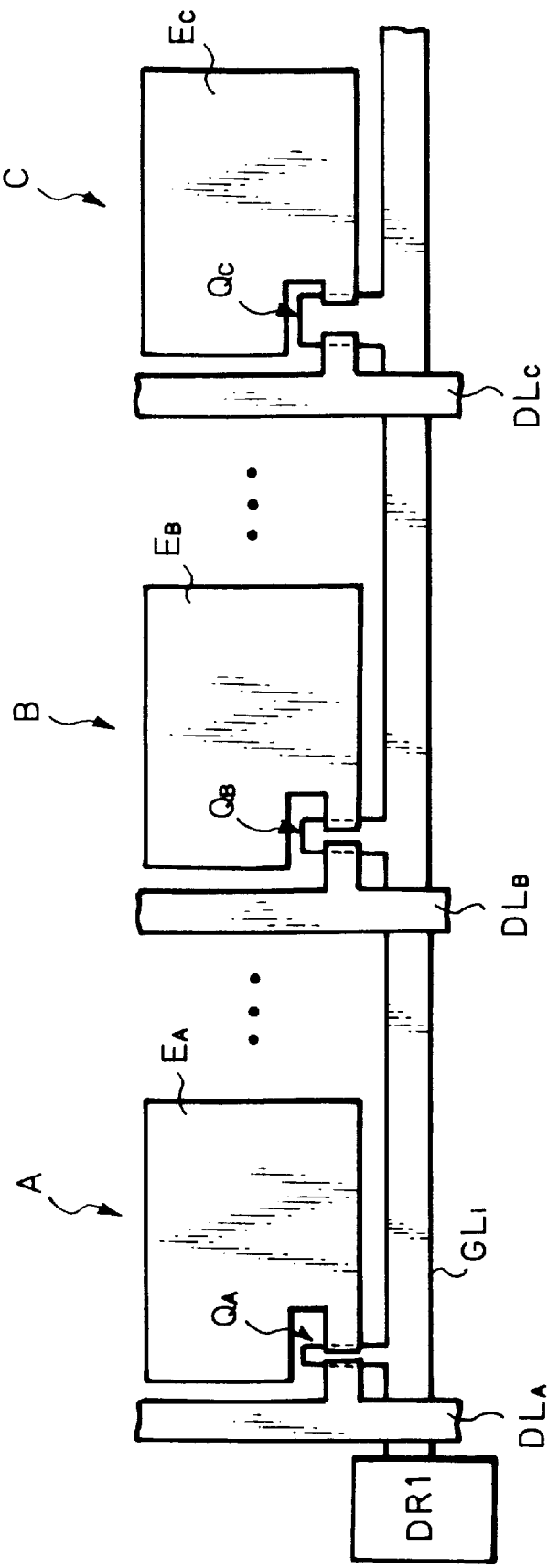
FIG. 3 is a plan view illustrating a prior art LCD apparatus.

In FIG. 3, which illustrates a second prior art LCD apparatus, the sizes of TFTs $Q_A$, $Q_B$ and $Q_C$ are gradually increased, thus compensating for the in-plane-fluctuation $\Delta V_{FD}$ (see JP-A-3-306221). Note that pixels A, B and C of FIG. 3 correspond to the pixels A, B and C, respectively, of FIG. 1.

In the LCD apparatus of FIG. 3, however, the leakage current of the TFTs is increased.

Figure 4:
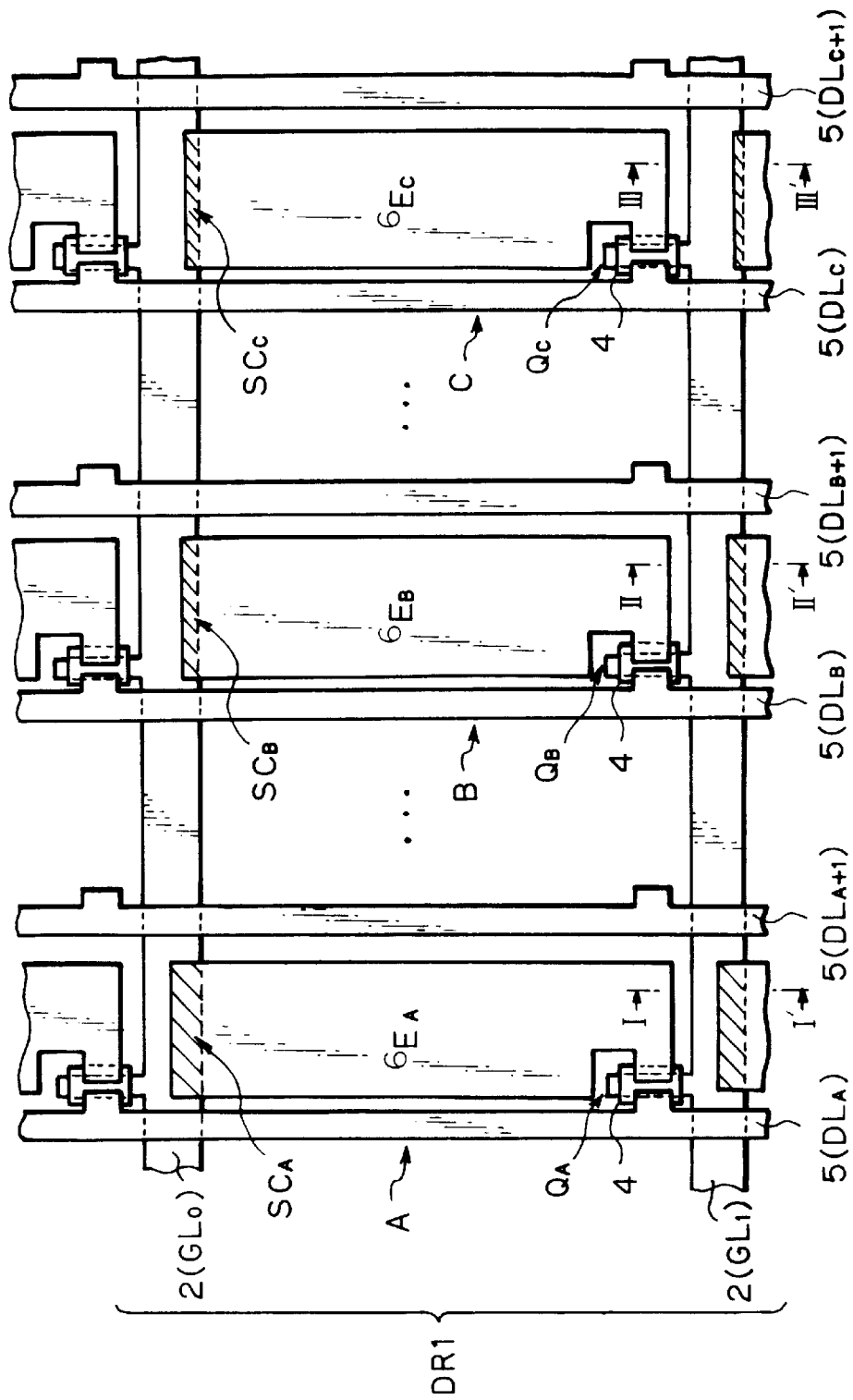
FIG. 4 is a plan view illustrating a first embodiment of the LCD apparatus according to the present invention.
Figure 5A:
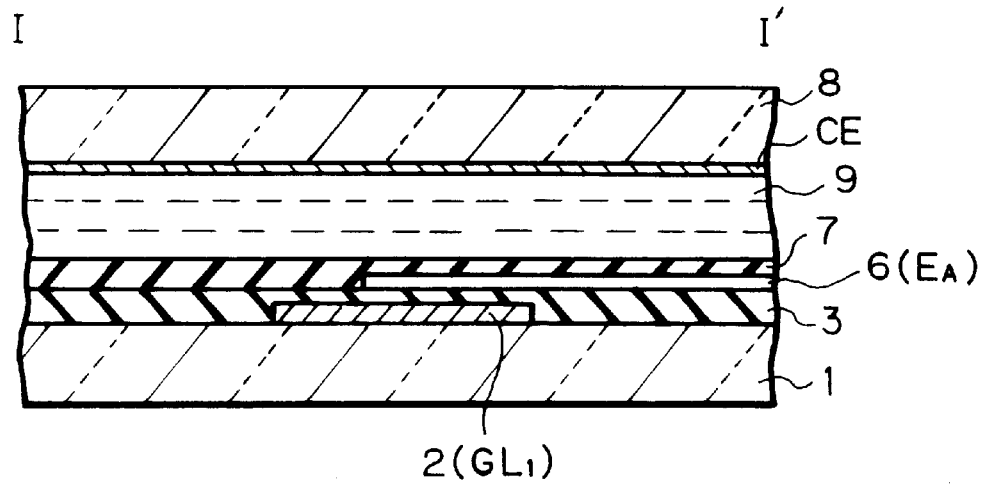
FIGS. 5A, 5B and 5C are cross-sectional views taken along the lines I–I', II–II' and III–III', respectively, of the apparatus of FIG. 4.
Figure 5B:
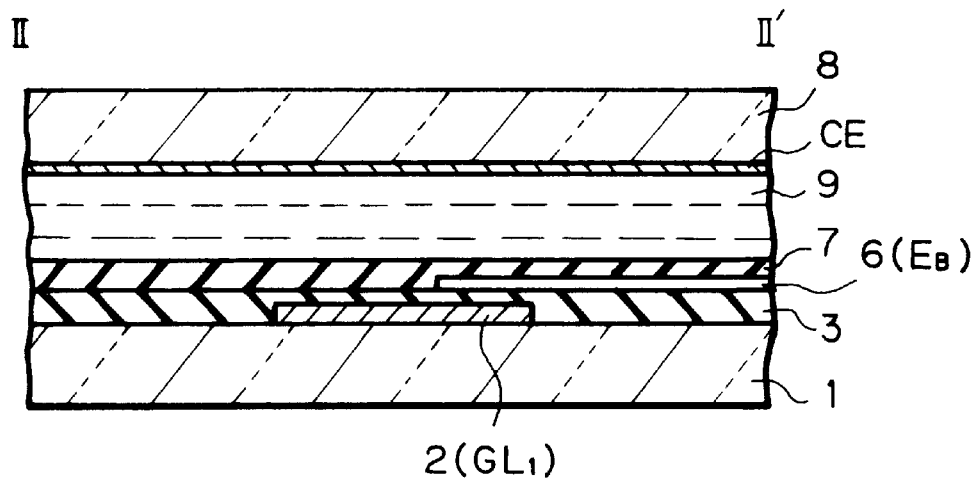
Figure 5C:
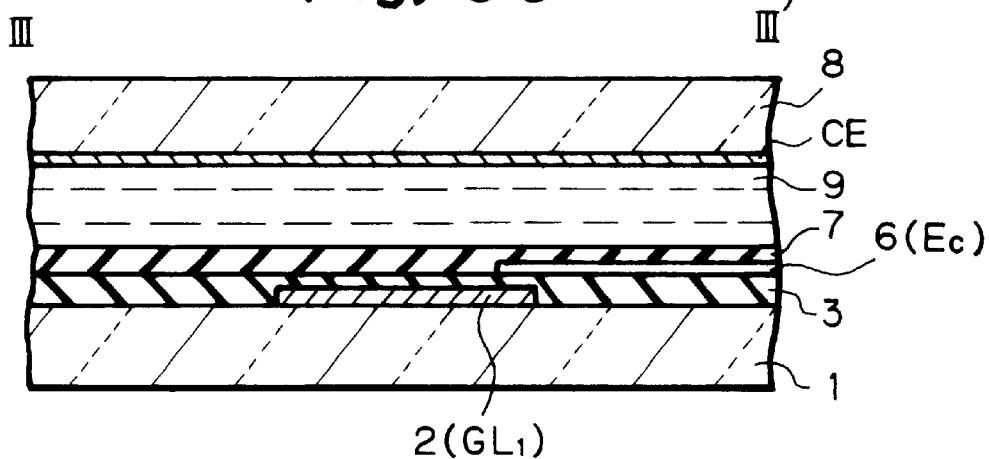

FIG. 4 is a plan view illustrating a first embodiment of the present invention, and FIGS. 5A, 5B and 5C are cross-sectional views taken along the lines I–I', II–II' and III–III', respectively, of FIG. 4. Note that the LCD apparatus of the first embodiment is of a gate storage type, and also, pixels A, B and C of FIG. 4 correspond to the pixels A, B and C, respectively, of FIG. 1.

In FIGS. 4, 5A, 5B and 5C, a conductive layer 2 made of Cr or the like is deposited on a glass substrate 1, and patterned to form gate lines $GL_0$, $GL_1$, ..., which also serve as gate electrodes of TFTs $Q_A$, $Q_B$ and $Q_C$. Also, a gate insulating layer 3 made of silicon nitride is deposited on the entire surface. Further, a semiconductor active layer 4 made of amorphous silicon is formed and patterned. In addition, a conductive layer 5 made of Cr or the like is deposited and patterned to form drain lines $DL_A$, $DL_B$ and $DL_C$ as well as source electrodes (not shown) of the TFTs $Q_A$, $Q_B$ and $Q_C$. Then, an indium tin oxide (ITO) layer 6 is deposited by a sputtering process, and is patterned to form transparent pixel electrodes $E_A$, $E_B$ and $E_C$ which are connected to the source electrodes of the TFTs $Q_A$, $Q_B$ and $Q_C$, respectively. Further, a passivation layer 7 is formed on the entire surface.

On the other hand, a common counter electrode CE is formed on a counter glass substrate 8. Finally, liquid crystal as indicated by reference numeral 9 is inserted into a gap between the passivation layer 7 and the common counter electrode CE.

In FIGS. 4, 5A, 5B and 5C, the adjacent gate line $GL_0$ is overlapped via the gate insulating layer 3 to the transparent pixel electrodes $E_A$, $E_B$ and $E_C$ to form storage capacitors $SC_A$, $SC_B$ and $SC_C$, respectively, to form a gate storage type apparatus.

As indicated by shaded portions in FIGS. 5A, 5B and 5C, the overlapped areas between the adjacent gate line $GL_0$ and the transparent pixel electrodes $E_A$, $E_B$ and $E_C$ are gradually reduced as the distance from the gate line driving circuit DR1 is increased. Therefore, $$C_{SCA} \rangle C_{SCB} \rangle C_{SCC} \quad (4)$$

where $C_{SCA}$, $C_{SCB}$ and $C_{SCC}$ are capacitances of the storage capacitors $SC_A$, $SC_B$ and $SC_C$, respectively.

Figure 6:
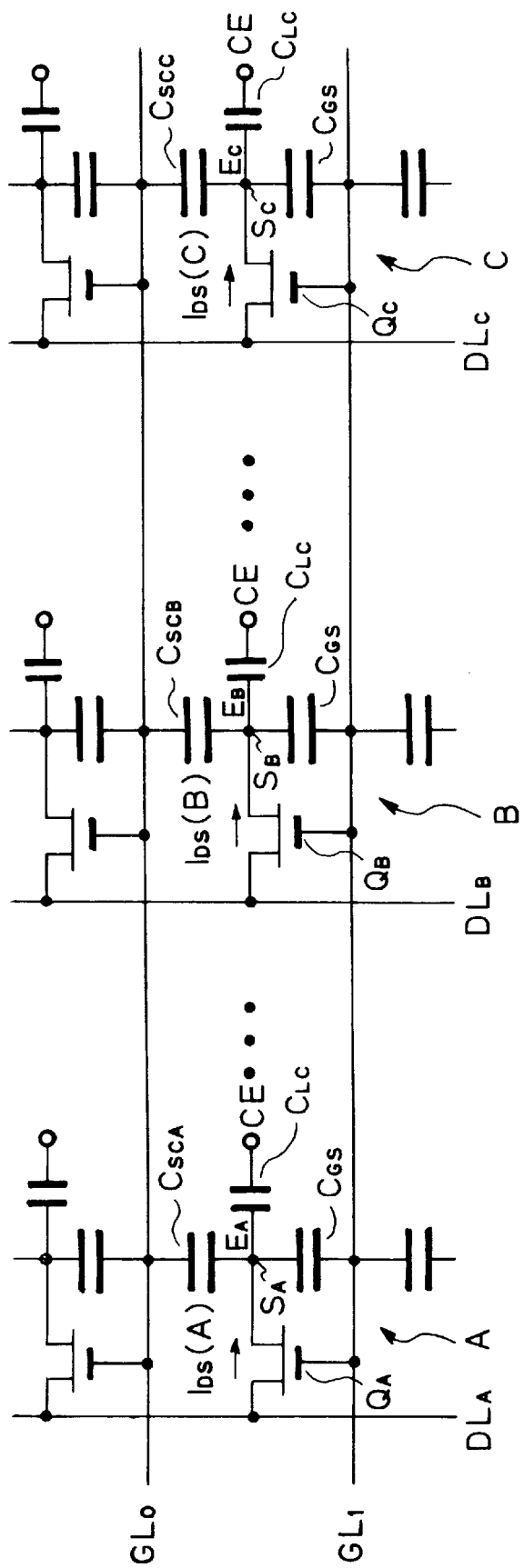
FIG. 6 is an equivalent circuit diagram of the apparatus of FIG. 4.

In FIG. 6, which is an equivalent circuit diagram of the apparatus of FIGS. 4, 5A, 5B and 5C, the feed-through voltage $V_{FD}(A)$ at the pixel A is $$V_{FD}(A)=(C_{GS} \cdot \Delta V_G - \int I_{DS}(A) dt)/(C_{LC}+C_{SCA}+C_{GS}) \quad (5)$$

Also, the feed-through voltage $V_{FD}(B)$ at the pixel B is $$V_{FD}(B)=(C_{GS} \cdot \Delta V_G - \int I_{DS}(B) dt)/(C_{LC}+C_{SCB}+C_{GS}) \quad (6)$$

Further, the feed-through voltage $V_{FD}(C)$ at the pixel C is $$V_{FD}(C)=(C_{GS} \cdot \Delta V_G - \int I_{DS}(C) dt)/(C_{LC}+C_{SCC}+C_{GS}) \quad (7)$$

In this case, generally, $$\int I_{DS}(A) dt < \int I_{DS}(B) dt < \int I_{DS}(C) dt \quad (8)$$

Therefore, if CSCA=SSCB=SSCC (in the prior art), from the formulae (5), (6) and (7), $$V_{FD}(A) > V_{FD}(B) > V_{FD}(C) \quad (9)$$

However, according to the first embodiment, since the capacitances $C_{SCA}$, $C_{SCB}$ and $C_{SCC}$ are adjusted under the condition (4), $$V_{FD}(A) \approx V_{FD}(B) \approx V_{FD}(C) \quad (10)$$

can be satisfied.

Figure 7A:
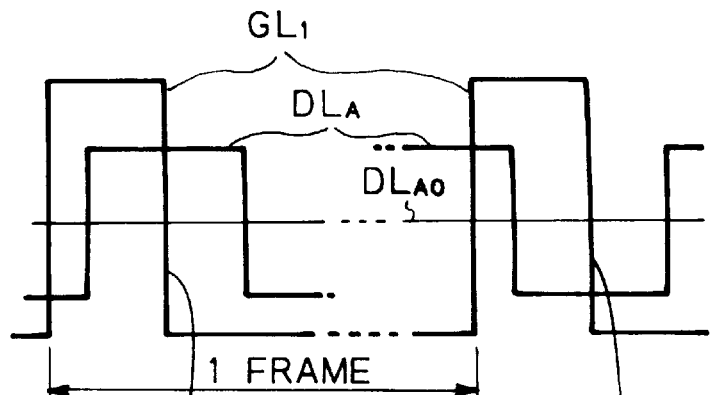
FIGS. 7A, 7B, 8A and 8B are timing diagrams for showing the operation of the apparatus of FIG. 4.
Figure 7B:
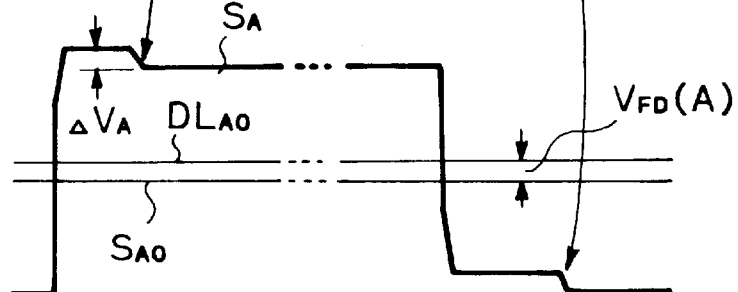

That is, at the pixel A, the voltage at the gate line $GL_1$ is changed rapidly as shown in FIG. 7A. In FIG. 7A, $DL_A$ designates the voltage at the drain line $DL_A$. As shown in FIG. 7B, when the voltage at the gate line $GL_1$ rapidly falls, the voltage at the source electrode $S_A$ of the TFT $Q_A$ also rapidly falls due to the capacitive coupling by $\Delta V_A$. In this case, since the leakage amount $\int I_{DS}(A) dt$ is small, the voltage at the source electrode $S_A$ remains at almost the same level. Also, the center value $S^{A0}$ of the voltage at the source electrode $S_A$ depends upon $\Delta V_A$. Therefore, the feed-through voltage $V_{FD}(A)$ is represented by $$V_{FD}(A)=DL_{A0}-S_{A0}$$

where $DL_{A0}$ is the center value of the voltage at the drain line $DL_A$ and is constant.

Figure 8A:
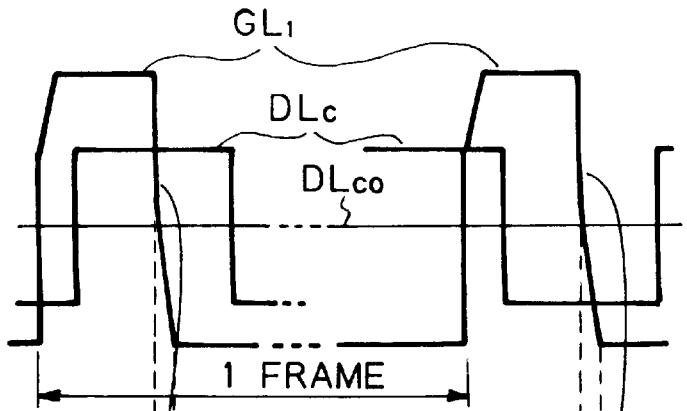
Figure 8B:
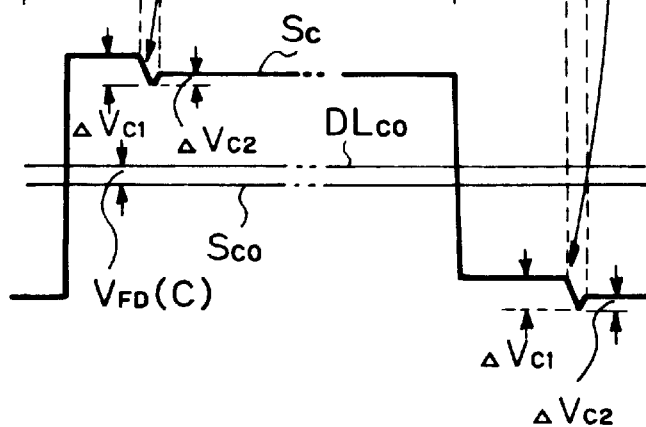

On the other hand, at the pixel C, the voltage at the gate line $GL_1$ is changed slowly as shown in FIG. 8A. In FIG. 8A, $DL_C$ designates the voltage at the drain line $DL_C$. As shown in FIG. 8B, when the voltage at the gate line $GL_1$ slowly falls, the voltage at the source electrode $S_C$ of the TFT $Q_C$ also slowly falls due to the capacitive coupling by $\Delta V_{C1}$. Note that the value $\Delta V_{C1}$ is larger than $\Delta V_A$, since $C_{SCC}$ is smaller than $C_{SCA}$. In this case, since the leakage amount $\int I_{DS}(C) dt$ is large, the voltage at the source electrode $S_C$ almost rises a little indicated by $\Delta V_{C2}$ in FIG. 8B. In this case, the center value $S_{C0}$ of the voltage at the source electrode $S_C$ depends upon $\Delta V_{C1}-\Delta V_{C2}$. Therefore, if $\Delta V_A =$ $\Delta V_{C1} - \Delta V_{C2}$, the feed-through voltage $V_{FD}$ (C) is represented by $$\Delta V_{FD}(C) = DL_{C0} - V_{FD}(A)$$

where $DL_{C0}$ is the center value of the voltage at the drain line $DL_C$ and is constant ($DL_{A0} = DL_{C0}$).

Figure 9:
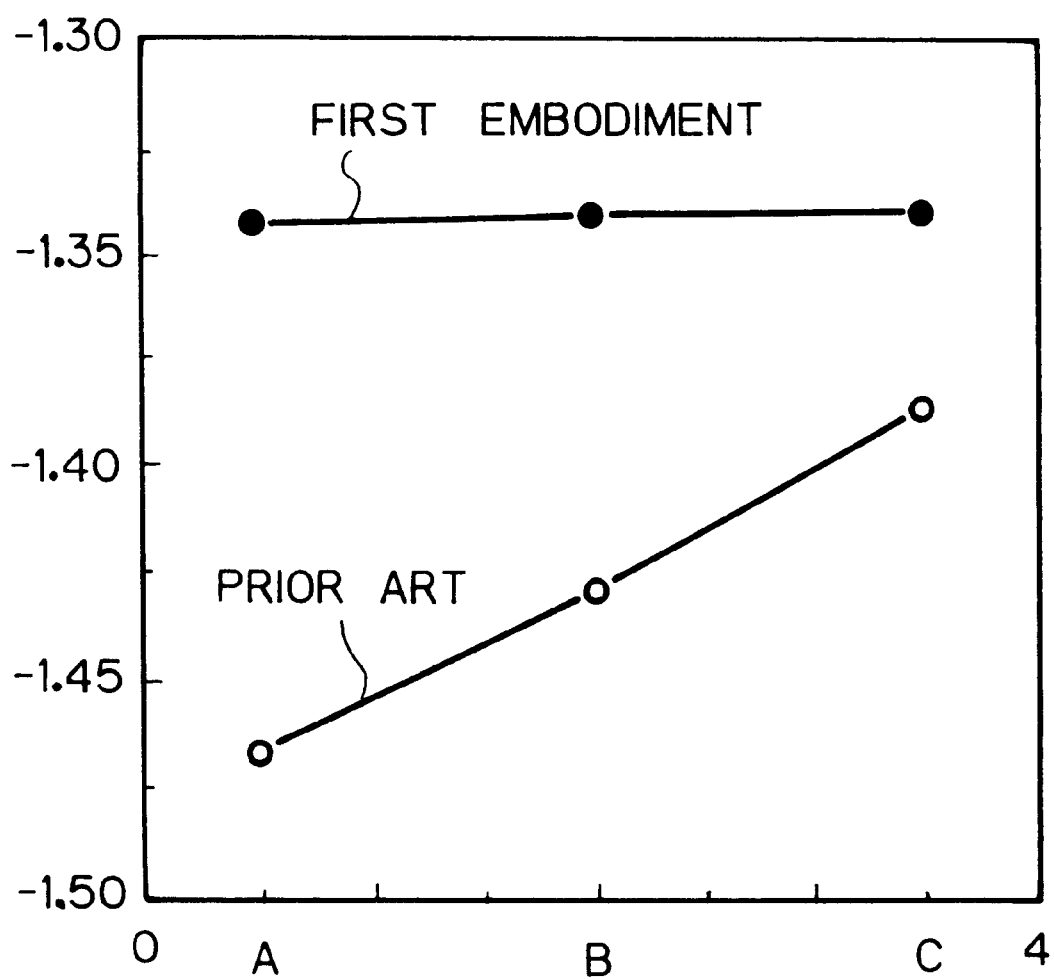
FIG. 9 is a graph showing the effect of the first embodiment and the prior art.

Thus, in the first embodiment, as shown in FIG. 9, the feed-through voltage $V_{FD}$ can be almost uniform within the pixel array.

Figure 11A:
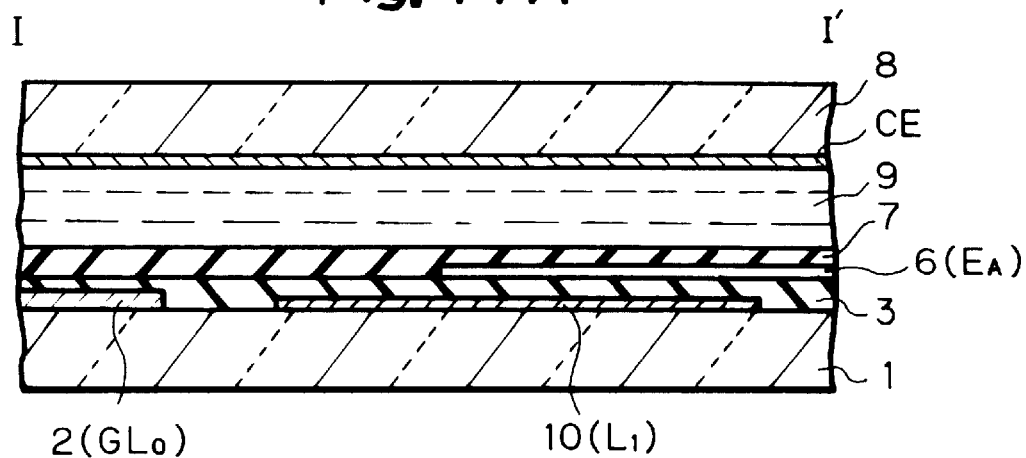
FIGS. 11A, 11B and 11C are cross-sectional views taken along the lines I–I', II–II' and III–III', respectively, of the apparatus of FIG. 10.
Figure 11B:
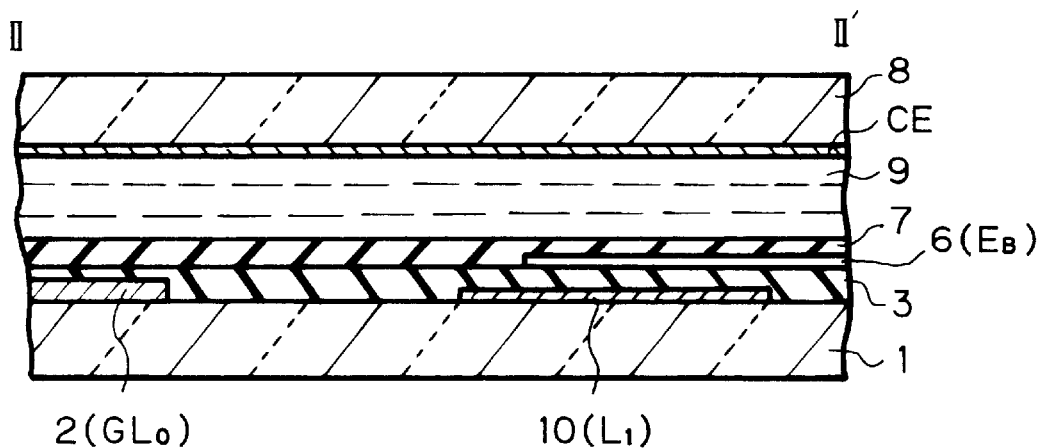
Figure 11C:
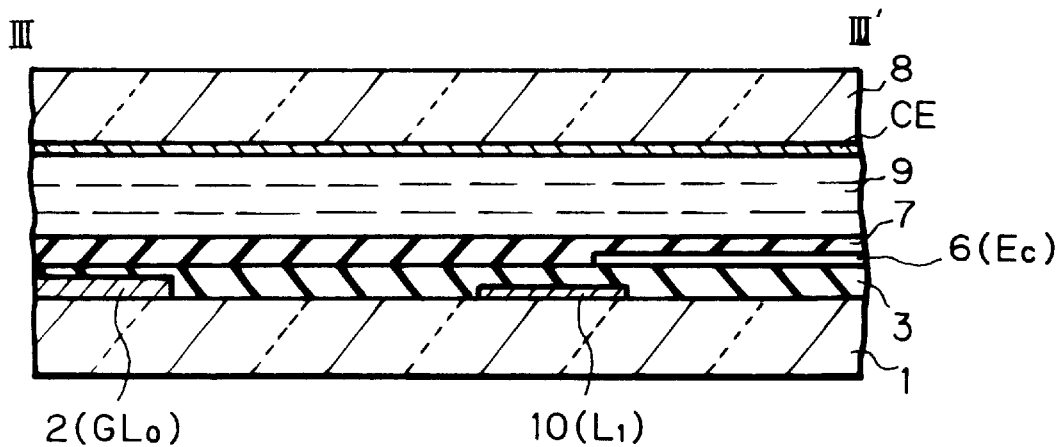
Figure 12:
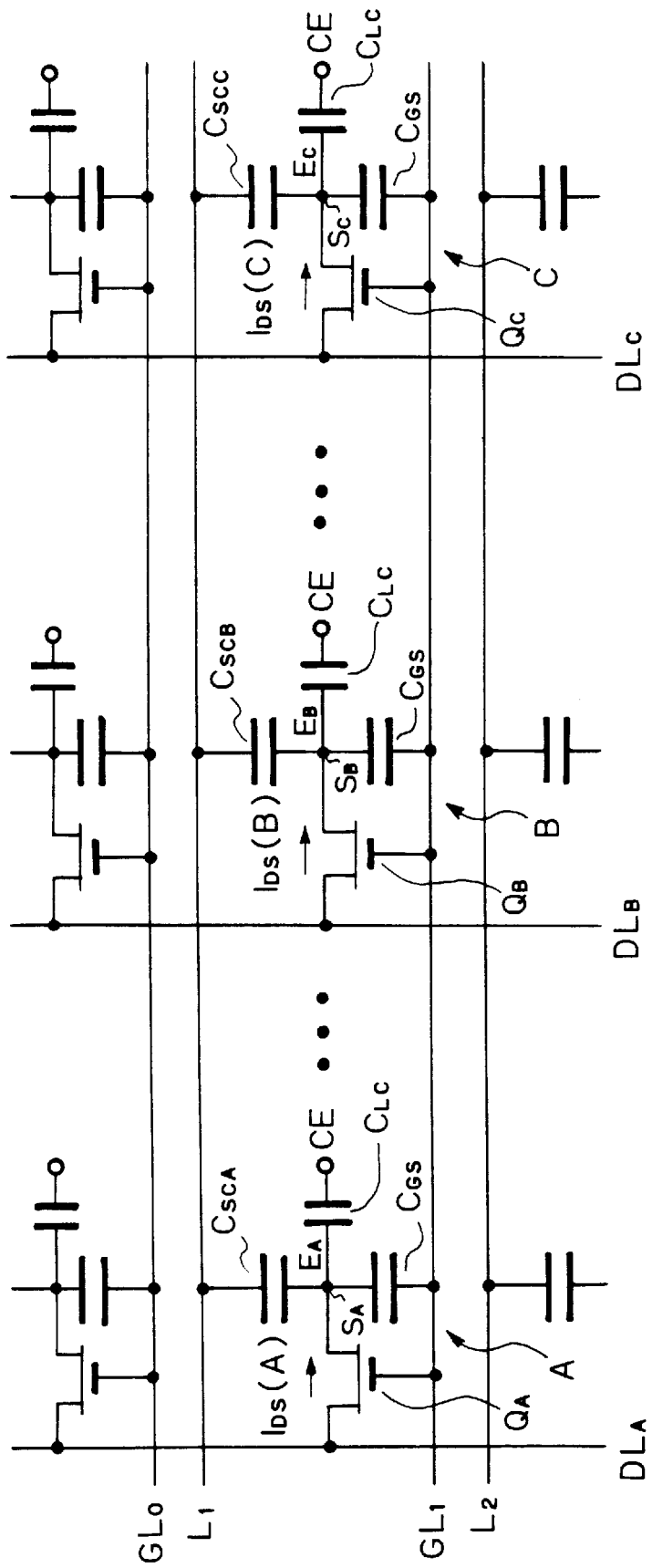
FIG. 12 is an equivalent circuit diagram of the apparatus of FIG. 10.
Figure 14A:
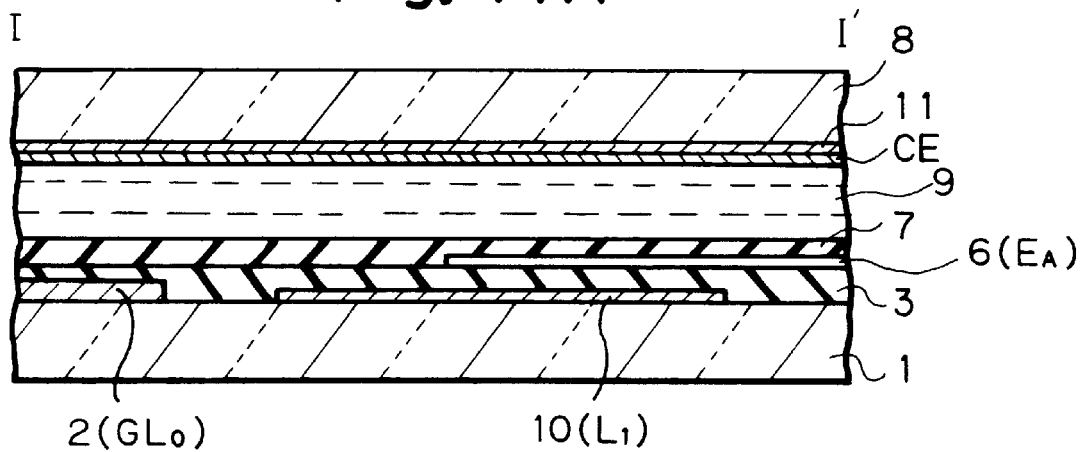
FIGS. 14A, 14B and 14C are cross-sectional views taken along the lines I–I', II–II' and III–III', respectively, of the apparatus of FIG. 13.
Figure 14B:
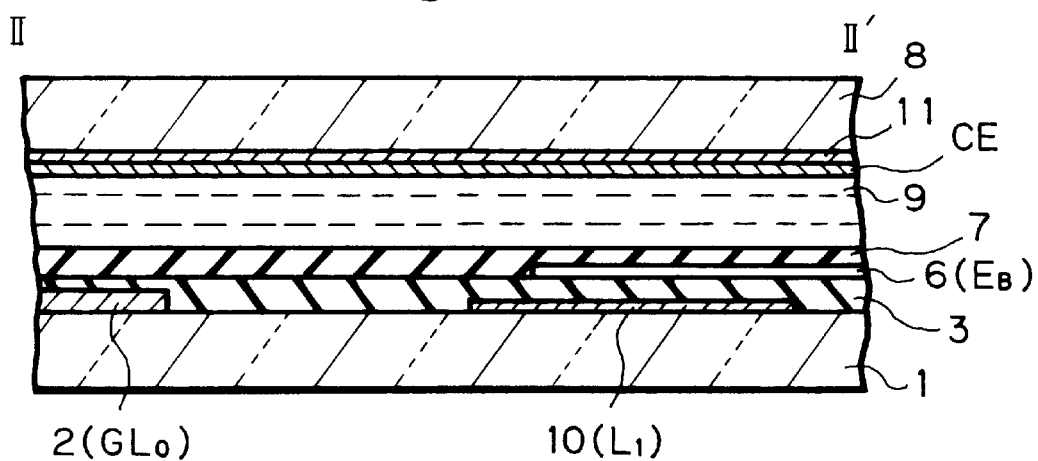
Figure 14C:
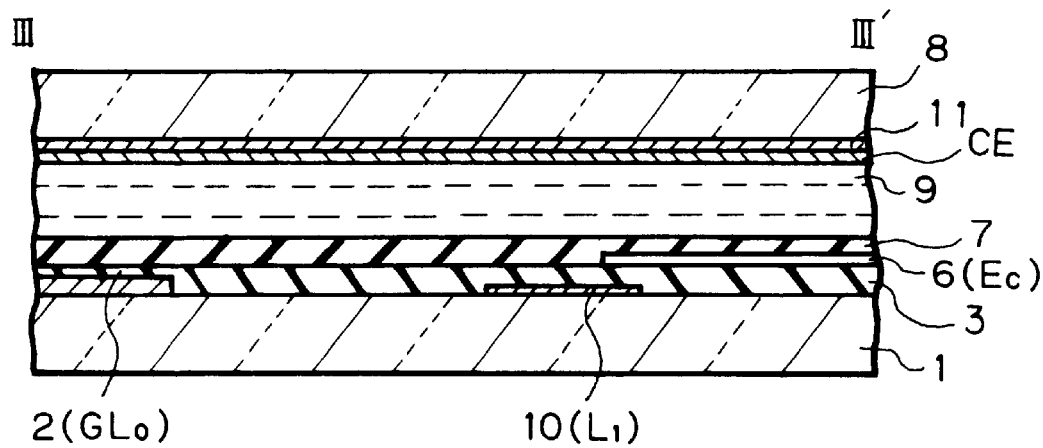

FIG. 10 is a plan view illustrating a second embodiment of the present invention, FIGS. 11A, 11B and 11C are cross-sectional views taken along the lines I–I', II–II' and III–III', respectively, of FIG. 10, and FIG. 12 is an equivalent circuit diagram of the apparatus of FIG. 10. Note that the LCD apparatus of the second embodiment is of a storage capacitor line type, and also, pixels A, B and C of FIG. 10 correspond to the pixels A, B and C, respectively, of FIG. 1.

In the second embodiment, storage capacitor lines $L_0$, $L_1$, are provided for the gate lines $GL_0$, $GL_1$, . . . . The storage capacitor lines $L_0$, $L_1$, are made of an ITO layer 10 on the glass substrate 1 as illustrated in FIGS. 11A, 11B and 11C.

In FIGS. 10, 11A, 11B, 11C and 12, the storage capacitor line $L_1$ is overlapped via the gate insulating layer 3 to the transparent pixel electrodes $E_A$, $E_B$ and $E_C$ to form storage capacitors $SC_A$, $SC_B$ and $SC_C$, respectively.

As indicated by shaded portions in FIGS. 11A, 11B and 11C, the overlapped areas between the storage capacitor line $L_1$ and the transparent pixel electrodes $E_A$, $E_B$ and $E_C$ are gradually reduced as the distance from the gate line driving circuit DR1. Therefore, in the same way as the formula (4), $$C_{SCA} \rangle C_{SCB} \rangle C_{SCC}$$

where $C_{SCA}$, $C_{SCB}$ and $C_{SCC}$ are capacitances of the storage capacitors $SC_A$, $SC_B$ and $SC_C$, respectively. Thus, the effect of the second embodiment is the same as that of the first embodiment.

FIG. 13 is a modification of the apparatus of FIG. 10, and FIGS. 14A, 14B and 14C are cross-sectional views taken along the lines I–I', II–II' and III–III', respectively, of FIG. 13. That is, an optical shield layer 11 is mounted on the glass substrate 8, and the overlapped portions between the storage capacitor line $L_1$ and the transparent pixel electrodes $E_A$, $E_B$ and $E_C$ are changed under the optical shield layer 11. Thus, the fluctuation of the numerical aperture can be improved.

As explained hereinabove, according to the present invention, since the feed-through voltage can be uniform within the pixel array, the picture quality can be improved.

We claim:

1. A liquid crystal display apparatus comprising:

a plurality of gate lines;

a plurality of drain lines; and a plurality of pixels each including a liquid crystal cell having a pixel electrode connected to a storage capacitor and a switching element connected between said liquid crystal cell and one of said drain lines, a gate of said switching element being connected to one of said gate lines, capacitances of the storage capacitors of adjacent pixels of the same gate line are changed with respect to a change in distance between the input end of a corresponding one of the gate lines and the corresponding pixel of the adjacent pixels;

wherein said storage capacitor is formed by said pixel electrode, another gate line adjacent to said gate line and an insulating layer therebetween, an overlapped area of said pixel electrode and said another gate line being reduced by reducing an area of said pixel electrode as said distance is increased.

2. A liquid crystal display apparatus comprising:

a plurality of gate lines;

a plurality of drain lines; and a plurality of pixels each including a liquid crystal cell having a pixel electrode connected to a storage capacitor and a switching element connected between said liquid crystal cell and one of said drain lines, a gate of said switching element being connected to one of said gate lines, capacitances of the storage capacitors of adjacent pixels of the same gate line are changed with respect to a change in distance between the input end of a corresponding one of the gate lines and the corresponding pixel of the adjacent pixels, wherein said storage capacitor is formed by said pixel electrode, a storage capacitor line and an insulating layer therebetween, an overlapped area of said pixel electrode and said storage capacitor line being reduced as said distance is increased, wherein said storage capacitor line is made of transparent conductive material.

3. A liquid crystal display apparatus comprising:

a plurality of gate lines;

a plurality of drain lines; and a plurality of pixels each including a liquid crystal cell having a pixel electrode connected to a storage capacitor and a switching element connected between said liquid crystal cell and one of said drain lines, a gate of said switching element being connected to one of said gate lines, capacitances of the storage capacitors of adjacent pixels of the same gate line are changed with respect to a change in distance between the input end of a corresponding one of the gate lines and the corresponding pixel of the adjacent pixels, wherein said storage capacitor is formed by said pixel electrode, a storage capacitor line and an insulating layer therebetween, an overlapped area of said pixel electrode and said storage capacitor line being reduced as said distance is increased, wherein each of said pixels further has an optical shield layer, the overlapped area of said pixel electrode and said storage capacitor being changed under said optical shield.

4. A gate storage type liquid crystal display apparatus comprising:

a plurality of gate lines;

a gate line driving circuit connected to said gate lines;

a plurality of drain lines; and a plurality of pixels each including a liquid crystal cell having a pixel electrode connected to a storage capacitor, a switching element connected between said liquid crystal cell and one of said drain lines, and a storage capacitor formed by overlapping said pixel electrode over an adjacent one of said gate lines, a gate of said switching element being connected to one of said gate lines, capacitances of the storage capacitors of adjacent pixels of the same gate line are changed with respect to a change in distance between the input end of a corresponding one of the gate lines and the corresponding pixel of the adjacent pixels, wherein the capacitors of said storage capacitors are reduced, by reducing an area of said pixel electrode, as said distance is increased.

5. A storage capacitor line type liquid crystal display apparatus comprising:

a plurality of gate lines;

a gate line driving circuit connected to said gate lines;

a plurality of storage capacitor lines in parallel with said gate lines;

a plurality of drain lines; and a plurality of pixels each including a liquid crystal cell having a pixel electrode connected to a storage capacitor, a switching element connected between said liquid crystal cell and one of said drain lines, and a storage capacitor formed by overlapping said pixel electrode over one of said storage capacitor lines, a gate of said switching element being connected to one of said gate lines, capacitances of the storage capacitors of adjacent pixels of the same gate line are changed with respect to a change in distance between the input end of a corresponding one of the gate lines and the corresponding pixel of the adjacent pixels, wherein the capacitances of said storage capacitors are reduced as said distance is increased, and wherein said storage capacitor lines are made of transparent conductive material.

6. A storage capacitor line type liquid crystal display apparatus comprising:

a plurality of gate lines;

a gate line driving circuit connected to said gate lines;

a plurality of storage capacitor lines in parallel with said gate lines;

a plurality of drain lines; and a plurality of pixels each including a liquid crystal cell having a pixel electrode connected to a storage capacitor, a switching element connected between said liquid crystal cell and one of said drain lines, and a storage capacitor formed by overlapping said pixel electrode over one of said storage capacitor lines, a gate of said switching element being connected to one of said gate lines, capacitances of the storage capacitors of adjacent pixels of the same gate line are changed with respect to a change in distance between the input end of a corresponding one of the gate lines and the corresponding pixel of the adjacent pixels, wherein the capacitances of said storage capacitors are reduced as said distance is increased, and wherein each of said pixels further has an optical shield layer, the overlapped area of said pixel electrode and said storage capacitor being changed under said optical shield layer.

* * * * *

UNITED STATES PATENT AND TRADEMARK OFFICE
CERTIFICATE OF CORRECTION

PATENT NO. : 6,028,650
DATED : February 22, 2000
INVENTOR(S) : Syoichi Kuroha, et. al.

It is certified that error appears in the above-indentified patent and that said Letters Patent is hereby corrected as shown below:

Column 1, line 12 delete "TET", insert --TFT--

Column 4, line 29 delete "CSCA = SScB =SSCC", insert --$C_{scA} = C_{scB} = C_{scc}$--;

line 48 delete "$S^{AO}$", insert --$S_{AO}$--;

line 65-6 delete "In this case", insert --Also--

Column 5, line 4 delete "$\triangle$";

line 4 after "$DL_{co}$-, insert --$S_{co}$--;

line 19 after "$L_o,L_1$", insert --.....--;

line 21 after "$L_o, L_1$", insert --.....--

Signed and Sealed this

Twentieth Day of March, 2001

Attest:

NICHOLAS P. GODICI

*Attesting Officer*    *Acting Director of the United States Patent and Trademark Office*